Dec. 20, 1960   J. C. HOHNE, JR   2,965,827
DYNAMIC BRAKING SYSTEM FOR A REVERSIBLE MOTOR
Filed May 12, 1958
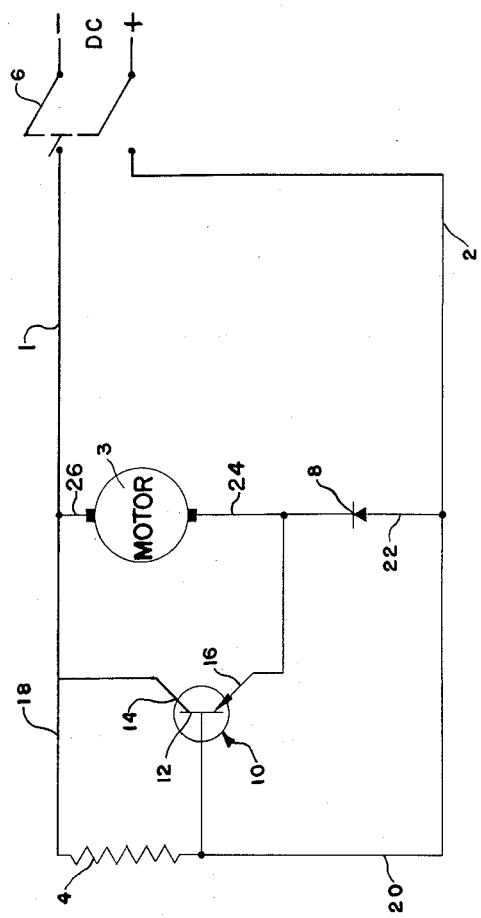
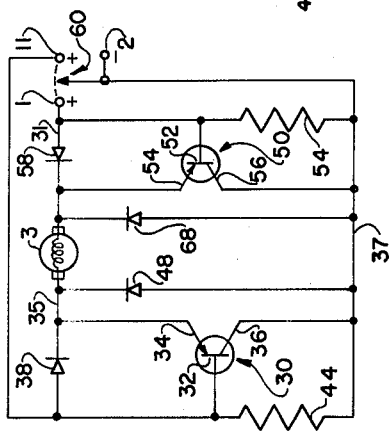
INVENTOR.
JACK C. HOHNE, JR.
BY *Milton E. Gilbert*
HIS ATTORNEY

United States Patent Office 2,965,827
Patented Dec. 20, 1960

2,965,827

DYNAMIC BRAKING SYSTEM FOR A REVERSIBLE MOTOR

Jack C. Hohne, Jr., Tipp City, Ohio, assignor to Globe Industries, Inc., Dayton, Ohio, a corporation of Ohio Filed May 12, 1958, Ser. No. 734,525

10 Claims. (Cl. 318—380)

This invention relates to a permanent magnet D.C. motor; and is more particularly concerned with an arrangement for dynamically braking said motor when current flow to the armature is discontinued.

Many arrangements have been proposed for dynamically braking an electric motor when its rotation is to be stopped, such as by short circuiting the armature. For this purpose, a switch has been employed which will close a short circuited path to the armature when the current input to the armature is discontinued, either by the same switch or by another switch actuating this first switch through a relay arrangement. Such devices have the disadvantage of presenting an undesirable time lag which is present in all mechanically operated switches.

It is one object of the invention to provide a dynamic braking arrangement for a motor whereby the shortcomings of the prior art are eliminated. It is a further object of the invention to provide a dynamic braking system for an electric motor which operates instantaneously upon current flow being discontinued to the armature. A still further advantage of the invention is to provide a simplified switching arrangement for an electric motor. Still another advantage of the invention is to provide an automatic dynamic braking system for a reversible motor. These and other advantages will become more readily apparent upon a reading of the description following hereinafter, and upon an examination of the drawings, in which:

Figure 1 is a schematic representation of a preferred embodiment of the invention, and Figure 2 is a schematic representation of the invention as applied to the dynamic braking and control of a reversible motor.

In the dynamic braking system of the invention a transistor is employed which is preferably placed in parallel with the armature coil of the motor. When the power input to the armature coil of the motor is discontinued, the transistor circuit serves to short circuit the armature.

Referring now to the drawings, 3 indicates a motor, which in this instance is a permanent magnet D.C. motor. Power from a D.C. source is controlled by a switch 6. Current flow through the armature of the motor 3 is through line 1, 26, 24, 22 and 2. In line 22, in series with the motor 3 is a diode 8; and in parallel with the diode 8, and in parallel with the motor 3 is a transistor 10; i.e. the emitter 16 and collector 14 electrodes of which are in parallel with the motor 3 and the emitter 16 and base 12 are in parallel with the diode. The base 12 of the transistor 10 is connected back to one side of the diode 8 by line 20; and is connected through a resistor 4 to the other side of the motor 3 through line 18.

Preferably, the diode 8 is so selected that it has a characteristic of having about one half a volt voltage drop (or within the range of .2 to 1 volt drop across the diode) whenever current flows. This voltage drop is almost independent of current, so that whether the motor is drawing stall current, starting current, or no load running current, the voltage drop is about the same. Transistor 10 is connected to the motor side of the diode 8, and since there is preferably a half volt voltage drop through the diode 8, the emitter of the transistor is approximately a half volt negative with respect to the base of the transistor which is connected to the positive side of the diode through line 20. This half volt potential is more than sufficient to insure that the transistor does not conduct (it is essentially an open circuit or open switch). Current also flows through line 2, through line 20 and through resistor 4 to line 1. The current that will flow through this latter path will depend upon the value of the resistance 4. Preferably, the resistance 4 is so selected that current through this path will be in the order of ⅓ to ⅕ of the total motor power. By reducing the value of resistor 4, the dynamic braking time is decreased at the expense of more no load power loss on resistor 4 when the motor is running.

When switch 6 is open, the motor 3 continues to coast from its own inertia and generates a back E.M.F., which makes the motor terminal at the diode side positive. When power is thus removed, the motor generates electricity in the same direction of polarity as the power that was previously applied. Assuming that line 2 was positive and line 1 was negative, as indicated in the drawing, then when power is off, line 24 will be positive with respect to line 26, so that the emitter 16 of the transistor is positive with respect to the base 12 and the collector 14 (due to the fact that diode 8 prevents current flow from line 24 to line 22). Because emitter 16 is positive with respect to the base 12, there will be a small flow of current in the emitter through the base and also through the collector 14. The transistor that is used is preferably one which has a low saturation resistance and depending upon the D.C. gain of the transistor, the current divides itself as required. Normally, about 90% of the current will flow from the emitter 16 through collector 14, and the other 10% will flow from the emitter 16 to the base 12 and through resistor 4 to the other side of the motor. Because of this arrangement, when the transistor is conducting, it has a very low impedance (for example, something on the order of one ohm or one-half ohm) and because of that, it acts as a short circuit. When this occurs, the motor will then be generating a voltage into a short circuit and it is thus quickly stopped.

When the switch 6 is thrown so as to operate the motor again, the transistor instantaneously is turned off, because the base 12 will then be positive with respect to the emitter 16.

As indicated above, the arrangement of the invention accomplishes a substantially instantaneous dynamic braking due to the fact that the switching is effected in a matter of micro seconds, as compared to a conventional relay or mechanical switch where the time required is in the order of tenths of a second. Thus, the time it takes from the moment the switch is opened, until it is thrown in the other position, may be very appreciable in certain applications, and if this time were measured in tenths of a second, it could very well become objectionable. For example, in a high speed motor running at 10,000 r.p.m., a tenth of a second delay in the operation of a mechanical switch or relay would result in several revolutions of the armature before it began to stop. Several revolutions would constitute a good percentage of the total number of revolutions it takes to stop, and this may very well be objectionable in the application to which the motor is put.

The system of the invention may be employed to accomplish a substantially instantaneous dynamic braking and permit the reversal of a motor by selectively applying voltage to either one of two terminals. This will essentially make a permanent magnet motor run as if it were a split series wound motor. Ordinarily, in order to reverse a permanent magnet motor, it is necessary to reverse the polarity through the armature, i.e. reverse both armature leads. In the system of the invention, a transistor accomplishes this simply by connecting the proper terminal to the minus power lead, when plus power is applied to the opposite motor terminal; and concurrently dynamically braking the motor while the reversing switch is thrown. The application of the invention to a reversible motor is illustrated in Figure 2. Each side of the motor 3 is connected similarly to that illustrated in Figure 1, except that the collector of the respective transistors 30 and 50, instead of returning to the motor terminal, is returned to the minus power terminals. Diodes 38 and 58 are connected between the separate positive power terminals 1 and 11 and the motor, so that when power is applied to the side away from the motor, plus power will flow through the respective diode to operate the motor in the proper direction of rotation. On each side of the motor 3 there is arranged a transistor, the emitter of which is connected to the motor side of the respective diode, and the base of which is connected to the plus power side of the respective diode. In order to protect each transistor from inductive surges, a diode is placed in parallel with the emitter and collector elements of each transistor. The arrangement is such that when the reversing switch 60 is thrown to contact the opposite terminal, the motor will stop quickly and reverse.

In operation, when terminal 1 is connected to plus power current will flow in line 31, through resistor 54 to terminal 2. Current will also flow through diode 58, and since there is a voltage drop through this diode, the motor side of diode 58 will be more negative than the other side, and therefore the emitter 54 will be more negative than the base 52 of transistor 50. Therefore, transistor 50 will not be conducting and essentially will operate as an off switch. Current will then flow through the armature of motor 3, out the other brush to line 35 which is connected to emitter 34 of transistor 30. The current flow in this instance would be blocked by the diode 38. Therefore, the base 32 will be more negative with respect to the emitter 34, since the base 32 is connected through resistor 44 to the minus power terminal 2. Therefore the transistor 30 will be conducting. With transistor 30 conducting, then line 35 will be effectively connected to the negative power terminal 2 through the transistor electrodes 34 and 36. The transistors 30 and 50 therefore act as switches to permit the motor to run in either direction depending upon whether the switch 60 is actuated to contact terminal 1 or terminal 11.

When power is removed, i.e. when the movable contact is lifted off terminal 1, the motor will continue to coast from its on inertia and generate some voltage making the brush terminal of motor 3 on the side toward terminal 1 more negative with respect to the brush terminal connected to lead 35. The emitter 54 of transistor 50 will then become more positive than the base 52 of transistor 12, since the diode 58 will block this generated voltage from being transmitted to the base 52 of transistor 50. The transistor 50 will then turn on and conduct, and operate essentially as a low impedance switch. Current will then flow through the emitter 54 to collector 56, through line 37, through diode 48, and back to the other motor terminal connected to lead 35. The armature of motor 3 will then be short circuited and the motor will immediately stop. Continued motion of the movable contact of switch 62 engage the terminal 11 will cause current to flow through diode 38 and commence rotation of motor 3 in the opposite direction.

Although only preferred embodiments of the invention have been illustrated and described, various changes in the form and arrangement of the several elements will become apparent to those skilled in the art and may be made without departing from the scope of the invention as defined in the appended claims.

What is claimed is:

1. A dynamic braking system for an electric motor having an excitation coil comprising a transistor having emitter, collector and base electrodes, the emitter and collector electrodes being connected in parallel with the excitation coil of said motor, whereby when power input to said motor is discontinued said transistor circuit serves to short circuit said motor.

2. A dynamic braking system for an electric motor having an excitation coil connected in series with a source of power comprising a transistor having emitter, collector and base electrodes, the emitter and collector electrodes being connected in parallel with the excitation coil of said motor, current direction limiting means connected in series with said coil, said emitter and base electrodes being connected in parallel with said current direction limiting means, whereby when power input to said motor is discontinued said transistor circuit serves to short circuit said motor.

3. A dynamic braking system for an electric motor having an excitation coil connected in series with a source of power comprising a transistor having emitter, collector and base electrodes, the emitter and collector electrodes being connected in parallel with the excitation coil of said motor, rectifier means connected in series with said coil and in parallel with said emitter and base electrodes of said transistor, said rectifier means being so selected and arranged as to so bias said transistor that when said motor is operating current does not flow through said transistor, whereby when power input to said motor is discontinued said transistor circuit serves to short circuit said motor.

4. A dynamic braking system for an electric motor having an excitation coil connected in series with a source of power comprising a transistor having emitter, collector and base electrodes, the emitter and collector electrodes being connected in parallel with the excitation coil of said motor, resistance means connected in parallel with said base and collector electrodes of said transistor, rectifier means connected in series with said coil and in parallel with said emitter and base electrodes of said transistor, said rectifier means being so selected and arranged as to so bias said transistor that when said motor is operating current does not flow through said transistor, whereby when power input to said motor is discontinued said transistor circuit serves to short circuit said motor.

5. A dynamic braking and switching system for a reversible electric motor having an excitation coil comprising a first and a second transistor each having emitter, collector and base electrodes, the emitter and collector electrodes of each transistor being connected in parallel with the excitation coil of said motor, whereby when power input to said motor is discontinued said transistor circuit serves to short circuit said motor.

6. A dynamic braking and switching system for a reversible electric motor having an excitation coil connected in series with a source of power, means for reversing the polarity of said source, a symmetrically arranged transistor circuit comprising a first and a second transistor each having emitter, collector and base electrodes, the emitter and collector electrodes of each transistor being connected in parallel with said coil with the emitter of one transistor being connected to one end of said coil and the emitter of the other transistor being connected to the other end of said coil, each half of said symmetrical circuit including current direction limiting means connected in series with said coil and the emitter and base electrodes of one transistor being connected in parallel with said current direction limiting means, whereby when power input to said motor is discontinued said transistor circuit serves to short circuit said motor.

7. A dynamic braking and switching system for a reversible electric motor having an excitation coil connected in series with a source of power, means for reversing the polarity of said source, a symmetrically arranged transistor circuit comprising a first and a second transistor each having emitter, collector and base electrodes, the emitter and collector electrodes of each transistor being connected in parallel with said coil with the emitter of one transistor being connected to one end of said coil and the emitter of the other transistor being connected to the other end of said coil, each half of said symmetrical circuit including rectifier means connected in series with said coil and in parallel with the emitter and base electrodes of one transistor, said rectifier means being so selected and arranged as to so bias said one transistor that when said motor is operating in one direction of rotation current does not flow through said one transistor, whereby when said polarity reversing means is operated to momentarily discontinue power input to said motor said one transistor serves to short circuit said motor.

8. A dynamic braking and switching system for a reversible electric motor having an excitation coil connected in series with a source of power, means for reversing the polarity of said source, a symmetrically arranged transistor circuit comprising a first and a second transistor each having emitter, collector and base electrodes, the emitter and collector electrodes of each transistor being connected in parallel with said coil with the emitter of one transistor being connected to one end of said coil and the emitter of the other transistor being connected to the other end of said coil, each half of said symmetrical circuit including rectifier means connected in series with said coil and in parallel with the emitter and base electrodes of one transistor, said rectifier means being so selected and arranged as to so bias said one transistor that when said motor is operating in one direction of rotation current does not flow through said one transistor, and a second rectifier means connected in parallel with said coil, whereby when said polarity reversing means is operated to momentarily discontinue power input to said motor said one transistor serves to short circuit said motor and when said polarity reversing means is further operated to reverse the polarity of said power source and connect said coil to said reversed polarity input said second rectifier means serves to isolate said one transistor from said system.

9. A dynamic braking and switching system for a reversible electric motor having an excitation coil connected in series with a source of power, means for reversing the polarity of said source, a symmetrically arranged transistor circuit comprising a first and a second transistor each having emitter, collector and base electrodes, the emitter and collector electrodes of each transistor being connected in parallel with said coil with the emitter of one transistor being connected to one end of said coil and the emitter of the other transistor being connected to the other end of said coil, each half of said symmetrical circuit including a resistance means connected in parallel with the base and collector electrodes of one transistor, rectifier means connected in series with said coil and in parallel with the emitter and base electrodes of said one transistor, said rectifier means being so selected and arranged as to so bias said one transistor that when said motor is operating in one direction of rotation current does not flow through said one transistor, whereby when said polarity reversing means is operated to momentarily discontinue power input to said motor said one transistor serves to short circuit said motor.

10. A dynamic braking and switching system for a reversible electric motor having an excitation coil connected in series with a source of power, means for reversing the polarity of said source, a symmetrically arranged transistor circuit comprising a first and a second transistor each having emitter, collector and base electrodes, the emitter and collector electrodes of each transistor being connected in parallel with said coil with the emitter of one transistor being connected to one end of said coil and the emitter of the other transistor being connected to the other end of said coil, each half of said symmetrical circuit including a resistance means connected in parallel with the base and collector electrodes of one transistor, rectifier means connected in series with said coil and in parallel with the emitter and base electrodes of said one transistor, said rectifier means being so selected and arranged as to so bias said one transistor that when said motor is operating in one direction of rotation current does not flow through said one transistor, and a second rectifier means connected in parallel with said coil, whereby when said polarity reversing means is operated to momentarily discontinue power input to said motor said one transistor serves to short circuit said motor and when said polarity reversing means is further operated to reverse the polarity of said power source and connect said coil to said reversed polarity input second rectifier means serves to isolate said one transistor from said system.

References Cited in the file of this patent

UNITED STATES PATENTS

| | | |
|---|---|---|
| 2,413,070 | Reeves | Dec. 24, 1946 |
| 2,606,312 | Rogers | Aug. 5, 1952 |
| 2,821,639 | Bright et al. | Jan. 28, 1958 |

UNITED STATES PATENT OFFICE
CERTIFICATE OF CORRECTION

Patent No. 2,965,827                        December 20, 1960

Jack C. Hohne, Jr.

It is hereby certified that error appears in the above numbered patent requiring correction and that the said Letters Patent should read as corrected below.

Column 3, line 2, for "motor." read -- motor, --; line 15, for "terminals" read -- terminal --; line 54, for "on" read -- own --; line 69, for "62" read -- 60 to --; column 6, line 44, before "second" insert -- said --.

Signed and sealed this 28th day of November 1961.

(SEAL)
Attest:

ERNEST W. SWIDER
Attesting Officer

DAVID L. LADD
Commissioner of Patents
USCOMM-DC